(12) United States Patent
Jung et al.

(10) Patent No.: US 11,443,632 B2
(45) Date of Patent: Sep. 13, 2022

(54) VEHICLE AND CONTROL METHOD THEREOF

(71) Applicants: HYUNDAI MOTOR COMPANY, Seoul (KR); KIA MOTORS CORPORATION, Seoul (KR)

(72) Inventors: Seul-A Jung, Hwaseong-si (KR); Donghyuk Jeong, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 384 days.

(21) Appl. No.: 16/750,642

(22) Filed: Jan. 23, 2020

(65) Prior Publication Data

US 2021/0065552 A1 Mar. 4, 2021

(30) Foreign Application Priority Data

Aug. 28, 2019 (KR) ........................ 10-2019-0106088

(51) Int. Cl.
*G08G 1/16* (2006.01)
*H04N 7/18* (2006.01)
(Continued)

(52) U.S. Cl.
CPC ............... *G08G 1/162* (2013.01); *B60R 1/00* (2013.01); *G01S 13/867* (2013.01);
(Continued)

(58) Field of Classification Search
CPC .......... G08G 1/162; G08G 1/04; G08G 1/017; B60R 1/00; B60R 2300/10; B60R 2300/20; B60R 2300/80; B60R 21/013; G01S 13/867; G01S 13/931; G01S 2013/9316; G01S 2013/932; G01S 13/86; G01S 7/003; G06V 20/56; G06V 20/625; G06V 20/58; H04N 7/185; H04N 7/183; B60W 50/08; B60W 40/00; B60W 50/14; B60W 2050/146; B60W 30/08; B60W 40/02; B60W 2420/42; B60W 2420/52; B60W 2554/801; B60W 2556/45; G07C 5/0841; H04W 4/46; B60K 35/00; B60K 2370/12; B60K 2370/52; B60K 2370/736; B60Y 2300/08; B60Y 2400/304

See application file for complete search history.

(56) References Cited

U.S. PATENT DOCUMENTS 10,089,869 B1 * 10/2018 Makled ................. G08G 1/205

* cited by examiner

*Primary Examiner* — James M Pontius
(74) *Attorney, Agent, or Firm* — Morgan, Lewis & Bockius LLP

(57) ABSTRACT

A vehicle includes: a transceiver configured to communicate with another vehicle; an acceleration sensor configured to detect an impact of the vehicle; a camera configured to acquire first image data of an external field of view of the vehicle; and a controller configured to determine whether an impact of the vehicle with a first vehicle has occurred based on an output value of the acceleration sensor, perform image processing for the first vehicle that generated the impact of the vehicle based on the first image data when is the controller determines that the impact of the vehicle has occurred, and to control the transceiver to request the another vehicle for second image data corresponding to an occurrence time of the impact of the vehicle when the plate number of the first vehicle is not identified based on the image processing.

18 Claims, 7 Drawing Sheets

(51) Int. Cl.
  *G01S 13/931* (2020.01)
  *G01S 13/86* (2006.01)
  *B60R 1/00* (2022.01)
  *G06V 20/56* (2022.01)
  *G06V 20/62* (2022.01)
(52) U.S. Cl.
  CPC ............ *G01S 13/931* (2013.01); *G06V 20/56* (2022.01); *H04N 7/185* (2013.01); *B60R 2300/10* (2013.01); *B60R 2300/20* (2013.01); *B60R 2300/80* (2013.01); *G01S 2013/932* (2020.01); *G01S 2013/9316* (2020.01); *G06V 20/625* (2022.01)

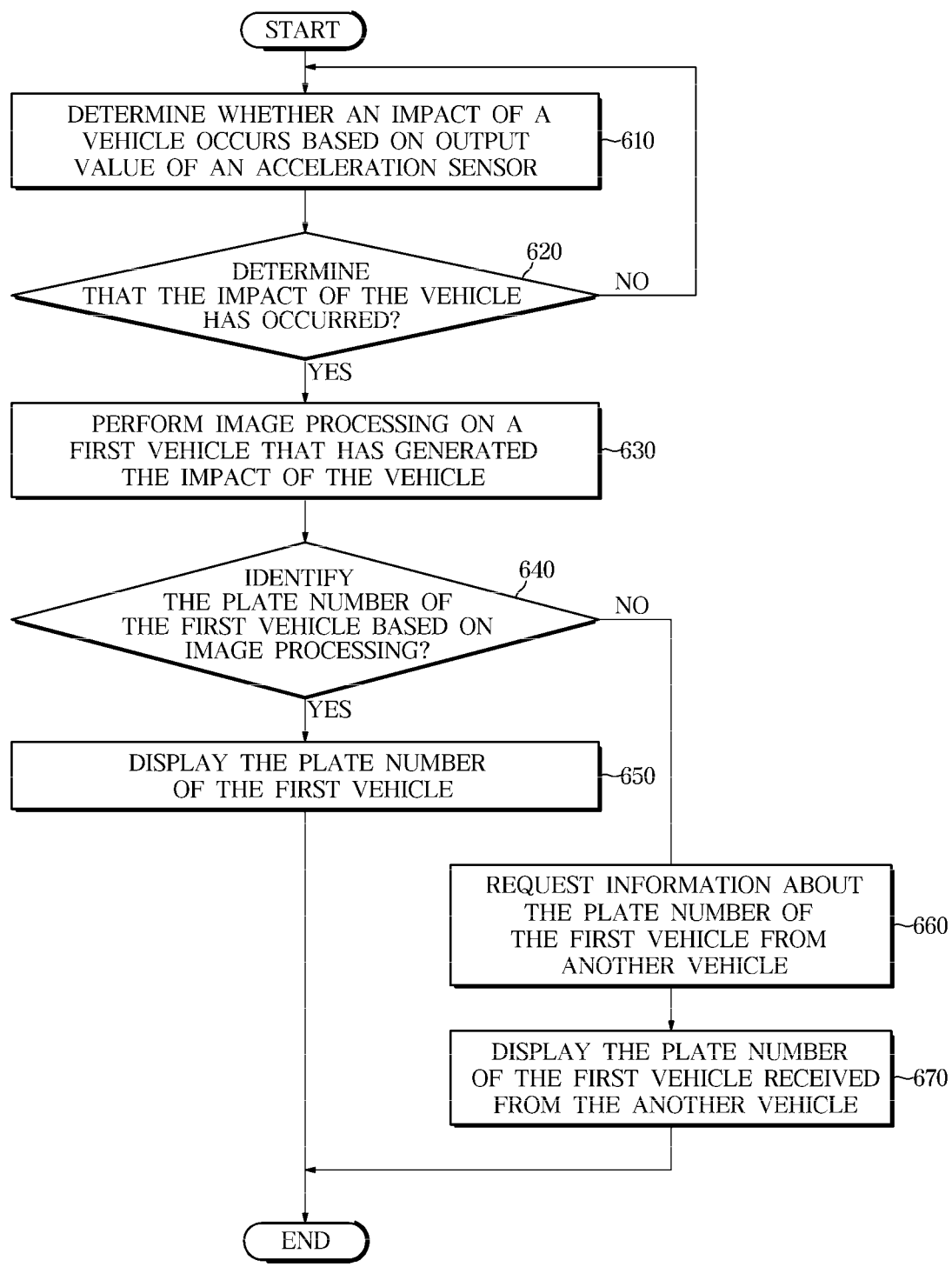

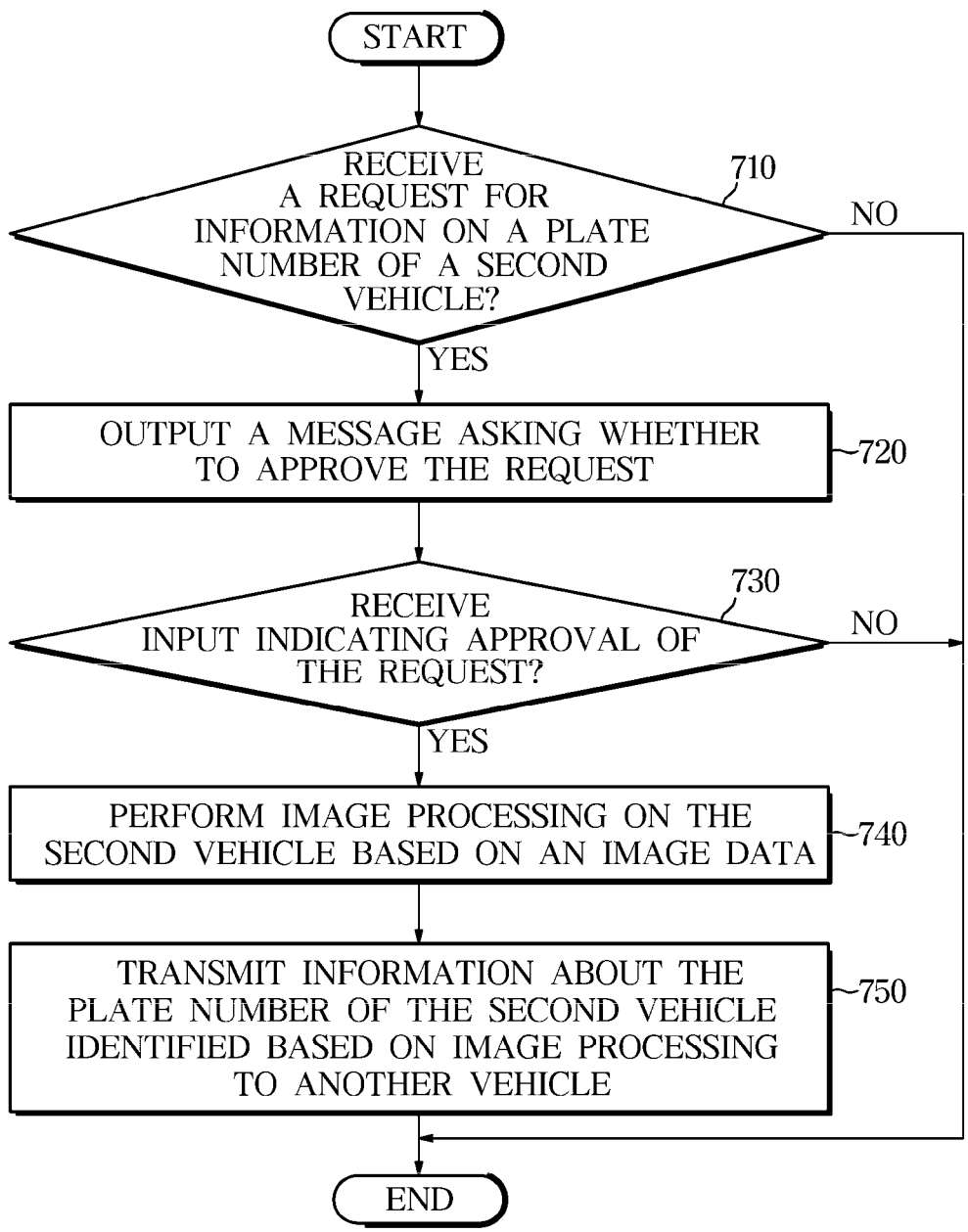

VEHICLE AND CONTROL METHOD THEREOF

CROSS-REFERENCE TO RELATED APPLICATION

The present application claims the benefit of priority to Korean Patent Application No. 10-2019-0106088, filed on Aug. 28, 2019 in the Korean Intellectual Property Office, the entire disclosure of which is incorporated herein by reference.

BACKGROUND

1. Technical Field

The present disclosure relates to a vehicle for sharing images by performing communication between vehicles and a control method thereof.

2. Description of the Related Art

In general, a camera may be installed in a vehicle. The camera installed in the vehicle may have an external field of view of the vehicle, such as a front view of the vehicle and a rear view of the vehicle.

Recently, image data acquired through the camera has been used as a reference for vehicle accidents. However, there is a limit in analyzing a vehicle accident using only image data acquired through the camera of the vehicle. Analyzing vehicle accidents may require image data obtained from other vehicles.

To this end, in the event of an accident, a driver of the vehicle may request image data directly from other vehicles, but there may be limitations. Moreover, if the image data from other vehicles is not immediately requested, it may be difficult to obtain image data at the time of the accident from another vehicle.

The above information disclosed in this Background section is only for enhancement of understanding of the background of the present disclosure, and should not be taken as acknowledgement that this information forms the prior art that is already known to a person skilled in the art.

SUMMARY

Therefore, according to an aspect of the present disclosure, a vehicle and a control method thereof can make it possible to request and receive accident related data from other vehicle in case of accident using communication between vehicles.

In accordance with an aspect of the present disclosure, a vehicle includes: a transceiver configured to communicate with another vehicle; an acceleration sensor configured to detect an impact of the vehicle; a camera configured to acquire first image data of an external field of view of the vehicle; and a controller configured to: determine whether an impact of the vehicle with a first vehicle has occurred based on an output value of the acceleration sensor, perform image processing for the first vehicle that generated the impact of the vehicle based on the first image data when the controller determines that the impact of the vehicle has occurred, and to control the transceiver to request the another vehicle for second image data corresponding to an occurrence time of the impact of the vehicle when a plate number of the first vehicle is not identified based on the image processing.

The vehicle further includes: a display, and the controller is further configured to control the display to display the plate number of the first vehicle based on the second image data when receiving the second image data corresponding to the occurrence time of the impact of the vehicle from the another vehicle through the transceiver.

The controller is further configured to control the transceiver to request the another vehicle for information about the plate number of the first vehicle when the plate number of the first vehicle is not identified based on the image processing.

The controller is further configured to control the transceiver to transmit information about the occurrence time of the impact of the vehicle to the another vehicle when the plate number of the first vehicle is not identified based on the image processing.

The vehicle further includes: a radar configured to acquire radar data of an external sensing field of view of the vehicle, and the controller is further configured to determine a direction of the impact of the vehicle based on at least one 7 of the first image data obtained by the camera or the radar data obtained by the radar, and to perform the image processing for the first vehicle based on the first image data corresponding to the determined direction.

The controller is further configured to determine a vehicle having a closest distance to the vehicle as the first vehicle based on the first image data.

The controller is further configured to control the display to display the plate number of the first vehicle when the plate number of the first vehicle is identified based on the image processing.

The controller is configured to perform image processing for a second vehicle based on the first image data when receiving a request, from the another vehicle, for information on a plate number of the second vehicle that caused an impact of the another vehicle with the second vehicle through the transceiver, and control the transceiver to transmit the information about the plate number of the second vehicle to the another vehicle when the plate number of the second vehicle is identified.

The controller is further configured to control the transceiver to transmit image data corresponding to an occurrence time of the impact of the another vehicle with the second vehicle to the another vehicle when receiving a request, from the another vehicle, for information on the occurrence time of the impact of the another vehicle through the transceiver.

The vehicle further includes: an input device to receive an input from a driver of the vehicle, and the controller is configured to control the display to output a message asking whether to approve the request when receiving the request through the transceiver, and to initiate the image processing for the second vehicle based on an input to the message through the input device.

In accordance with an aspect of the disclosure, a control method of a vehicle comprising a transceiver configured to communicate with another vehicle, an acceleration sensor configured to detect an impact of the vehicle, and a camera configured to acquire first image data of an external field of view of the vehicle, includes: determining whether an impact of the vehicle with a first vehicle has occurred based on an output value of the acceleration sensor; performing image processing for the first vehicle that generated the impact of the vehicle based on the first image data when the impact of the vehicle is determined to have occurred; and controlling the transceiver to request the another vehicle for second image data corresponding to an occurrence time of the impact of the vehicle when a plate number of the first vehicle is not identified based on the image processing.

The vehicle further includes a display, and the control method further includes: controlling the display to display the plate number of the first vehicle based on the second image data when receiving the second image data corresponding to the occurrence time of the impact of the vehicle from the another vehicle through the transceiver.

The control method further includes: controlling the transceiver to request the another vehicle for information about the plate number of the first vehicle when the plate number of the first vehicle is not identified based on the image processing.

The control method further includes: controlling the transceiver to transmit information about the occurrence time of the impact of the vehicle to the another vehicle when the plate number of the first vehicle is not identified based on the image processing.

The vehicle further includes a radar configured to acquire radar data of an external sensing field of view of the vehicle. The performing image processing for the first vehicle includes: determining a direction of the impact of the vehicle based on at least one of the first image data obtained by the camera or the radar data obtained by the radar; and performing the image processing for the first vehicle based on the first image data corresponding to the determined direction.

The performing image processing for the first vehicle includes: determining a vehicle having a closest distance to the vehicle as the first vehicle based on the first image data.

The control method further includes: controlling the display to display the plate number of the first vehicle when the plate number of the first vehicle is identified based on the image processing.

The control method further includes: performing the image processing for a second vehicle based on the first image data when receiving a request, from the another vehicle, for information on a plate number of the second vehicle that caused an impact of the another vehicle with the second vehicle through the transceiver; and controlling the transceiver to transmit the information about the plate number of the second vehicle to the another vehicle when the plate number of the second vehicle is identified.

The control method further includes: controlling the transceiver to transmit image data corresponding to an occurrence time of the impact of the another vehicle with the second vehicle to the another vehicle when receiving a request, from the another vehicle, for information on the occurrence time of the impact of the another vehicle through the transceiver.

The vehicle further includes an input device to receive an input from a driver of the vehicle. The performing image processing for a second vehicle includes: controlling the display to output a message asking whether to approve the request when receiving the request through the transceiver; and initiating the image processing for the second vehicle based on an input to the message through the input device.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 6 is a flowchart illustrating a case of requesting a plate number of a first vehicle from another vehicle in a control method of a vehicle according to an exemplary embodiment of the present disclosure.

FIG. 7 is a flowchart illustrating a case where a plate number of a second vehicle is requested from another vehicle in a vehicle control method according to an exemplary embodiment of the present disclosure.

DETAILED DESCRIPTION

Figure 1:
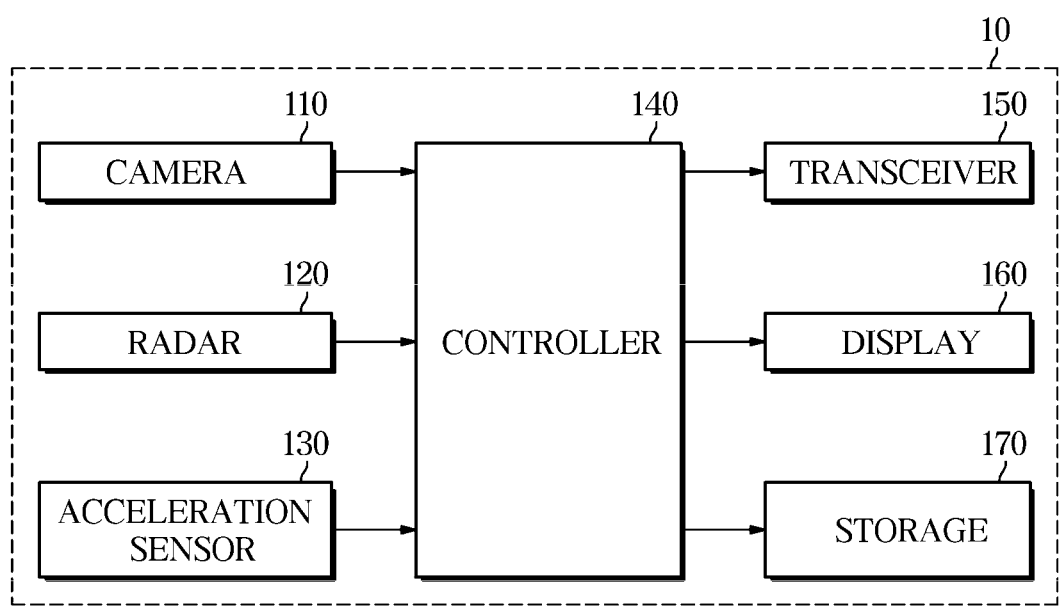
FIG. 1 is a control block diagram of a vehicle according to an exemplary embodiment of the present disclosure.

Like reference numerals refer to like elements throughout the specification. Not all elements of embodiments of the disclosure will be described, and description of what are commonly known in the art or what overlap each other in the embodiments will be omitted.

It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

As used herein, the singular forms "a," "an" and "the" are intended to include the plural forms as well, unless the context clearly indicates otherwise.

As used herein, the terms "portion," "unit," "block," "member," and "module" refer to a unit that can perform at least one function or operation. For example, these terms may refer to at least one process which is performed by at least one piece of hardware such as a field-programmable gate array (FPGA) and an application specific integrated circuit (ASIC), and at least one piece of software stored in a memory or a processor.

An identification code is used for the convenience of the description but is not intended to illustrate the order of each step. Each of the steps may be implemented in an order different from the illustrated order unless the context clearly indicates otherwise.

Hereinafter, embodiments of a vehicle and a method of controlling the vehicle according to an aspect will be described in detail with reference to the accompanying drawings.

FIG. 1 is a control block diagram of a vehicle according to an exemplary embodiment of the present disclosure.

Referring to FIG. 1, the vehicle 10 according to an exemplary embodiment of the present disclosure may include a camera 110 having an external field of view (field of view) of the vehicle 10 and acquiring image data, a radar 120 having an external sensing field of view of the vehicle 10 and acquiring radar data, an acceleration sensor 130 for detecting an impact of the vehicle 10, and a controller 140 configured to determine whether the impact of the vehicle (10) occurred on the basis of the output value of the acceleration sensor 130, to identify a plate number of a first vehicle 20 that caused the impact based on the image data when the impact occurred, and to control a transceiver 150 to request information about the plate number of the first vehicle 20 to another vehicle 30.

In addition, the vehicle 10 may include a transceiver 150 that performs communication between another vehicle and the vehicle, a display 160 provided inside the vehicle 10 to display information to the driver, and a storage 170 for storing various information, image data, radar data, etc. necessary for controlling the vehicle 10.

Camera 110 according to an exemplary embodiment may be provided in plurality, so as to have an external field of view of the vehicle 10 and may be provided to photograph each of the front of the vehicle 10, the side of the vehicle 10, and the rear of the vehicle 10.

Each camera 110 may include a plurality of lenses and an image sensor. The image sensor may include a plurality of photodiodes for converting light into an electrical signal, and the plurality of photodiodes may be arranged in a two-dimensional matrix.

Radar 120 according to an exemplary embodiment may be provided in plurality, so as to have an external sensing field of view of the vehicle 10 and may be provided to acquire radar data for each of the front of the vehicle 10, the side of the vehicle 10, and the rear of the vehicle 10.

Each radar 120 includes a transmit antenna (or transmit antenna array) that radiates transmit radio waves toward the outside of the vehicle 10 and a receive antenna (or receive antenna array) that receives reflected radio waves reflected from an object.

The radar 120 may obtain radar data from the radio wave transmitted by the transmit antenna and the reflected radio wave received by the receive antenna.

Acceleration sensor 130 according to an exemplary embodiment is a kind of impact detection sensor or motion detection sensor, detects the impact generated during the driving of the vehicle 10 and generates an output value corresponding to the impact detection signal can be generated Based on the instantaneous impact speed.

The controller 140 according to an exemplary embodiment may determine whether an impact of the vehicle 10 occurs based on an output value of the acceleration sensor 130. That is, the controller 140 may determine whether the impact of the vehicle 10 has occurred by comparing the output value of the acceleration sensor 130 with a predetermined threshold value.

If it is determined that the impact of the vehicle 10 has occurred, the controller 140 may perform image processing on the first vehicle 20 that has generated the impact of the vehicle 10 based on the image data. Image processing for the first vehicle 20 is described in more detail later.

According to an exemplary embodiment, when the plate number of the first vehicle is identified based on image processing, the controller 140 may control the display 160 to display the plate number of the first vehicle 20.

The controller 140 according to an exemplary embodiment may perform image processing for a second vehicle 40 based on the image data when receiving information about the plate number of the second vehicle 40 that caused the impact of another vehicle from another vehicle through the transceiver 150.

In this case, when the plate number of the second vehicle 40 is identified, the controller 140 may control the transceiver 150 to transmit information about the plate number of the second vehicle 40 to another vehicle.

In addition, the controller 140 may control the transceiver 150 to transmit image data corresponding to the received occurrence time information to another vehicle according to an exemplary embodiment when receiving a request for image data about the occurrence time of the impact of the another vehicle and the occurrence time information of the impact of the another vehicle from the another vehicle through the transceiver 150.

Also, according to an exemplary embodiment, the controller 140 may control the display 160 to output a message asking whether to approve the request when receiving information about the plate number of the second vehicle 40 from another vehicle through the transceiver 150.

At this time, the controller 140 may initiate image processing for the second vehicle 40 based on the input about the message through an input device (not shown).

The controller 140 may include at least one memory in which a program for performing the above-described operation and the operation described below is stored, and at least one processor for executing the stored program. In the case of a plurality of memories and processors, they may be integrated in one chip or may be provided in physically separated locations.

The transceiver 150 according to an exemplary embodiment may perform inter-vehicle communication. In detail, the transceiver 150 may communicate with another vehicle located at a short distance from the vehicle 10. Under the control of the controller 140, the transceiver 150 may request information from another vehicle or receive information corresponding to the request from another vehicle.

To this end, the transceiver 150 may transmit and receive data with another vehicle through wireless communication. According to one exemplary embodiment, the wireless communication may include cellular communication using at least one of 5G (5th generation), LTE, LTE Advance (LTE-A), code division multiple access (CDMA), wideband CDMA (WCDMA), universal mobile telecommunications system (UMTS), wireless broadband (WiBro) or global system for mobile communications (GSM). In addition, wireless communication may include, for example, short range communication. According to one exemplary embodiment, the short range communication may include at least one of wireless fidelity (WiFi), Bluetooth, or near field communication (NFC).

The display 160 according to an exemplary embodiment may display various information under the control of the controller 140 and provide information to the driver.

To this end, the display 160 may be provided inside the vehicle 10 and may include a panel. For example, the display 160 may be provided in a cluster or may be provided in a center fascia.

The Panel may include any one of cathode ray tube (CRT) panel, liquid crystal display (LCD) panel, light emitting diode (LED) panels organic light emitting diode (OLED) panel, plasma display panel (PDP) and a field emission display (FED) panel.

However, the position and the number of the display 160 may be included without limitation as long as the position and the number of the display 160 may visually transmit information to the driver of the vehicle 10.

The storage 170 according to an exemplary embodiment may store various types of information necessary for controlling the vehicle 10, and in particular, may store image data obtained through the camera 110 and radar data obtained through the radar 120. In addition, the storage 170 may store image data received from another vehicle.

The storage 170 may be implemented as at least one of a non-volatile memory device (for example, a cache, Read Only Memory (ROM), Programmable ROM (PROM), Erasable Programmable ROM (EPROM), Electrically Erasable Programmable ROM (EEPROM), and flash memory), a volatile memory device (for example, Random Access Memory (RAM)), or a storage medium (for example, Hard Disk Drive (HDD) and Compact Disc Read Only Memory (CD-ROM)), although not limited to these.

The storage 170 may be a memory implemented as a separate chip, or may be implemented as a single chip with a processor corresponding to the controller 140.

In addition, the vehicle 10 may include an input device (not shown) that receives an input from a driver. The input device (not shown) may be provided in a center fascia installed at the center of the dashboard, and may be implemented by using a physical button, a knob, a touch pad, a touch screen, a stick-type operation device or a trackball.

However, the location and implementation manner of the input device (not shown) are not limited to the above examples, and any location and implementation manner capable of receiving a user input may be included without limitation.

Figure 2:
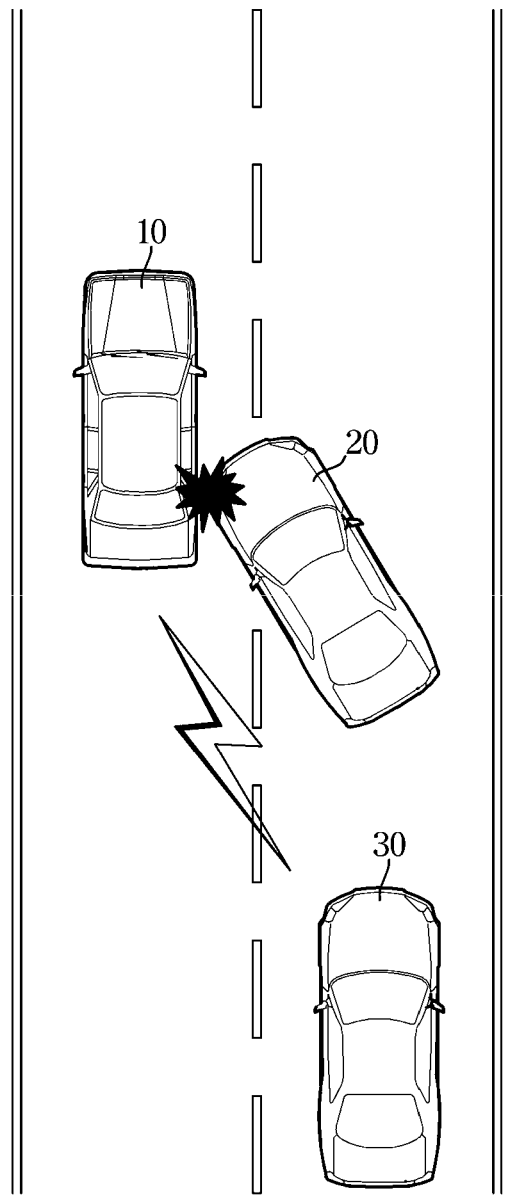
FIG. 2 is a diagram illustrating a case in which a vehicle requests information on a plate number of a first vehicle from another vehicle according to an exemplary embodiment of the present disclosure.
Figure 3:
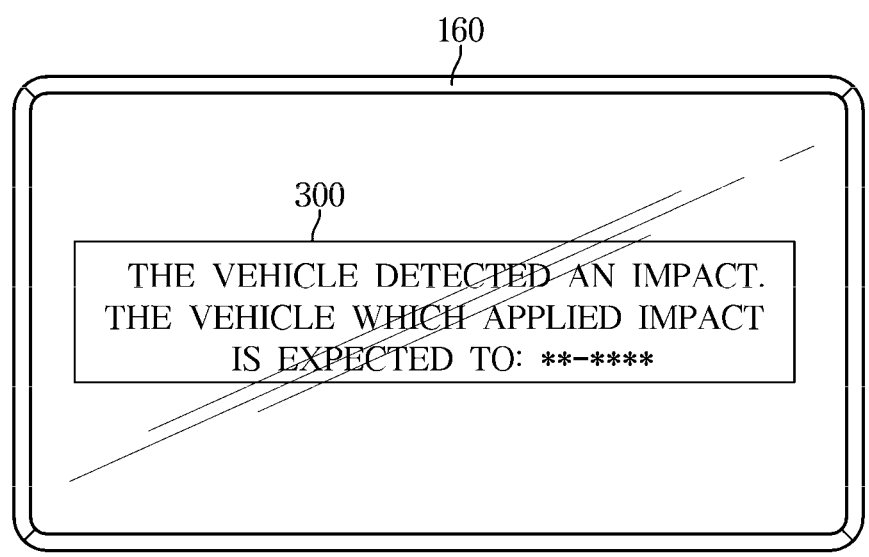
FIG. 3 is a view showing a case in which a vehicle according to an exemplary embodiment of the present disclosure outputs the plate number of the collision vehicle.

FIG. 2 is a diagram illustrating a case in which a vehicle requests information on a plate number of a first vehicle 20 from another vehicle according to an exemplary embodiment of the present disclosure. FIG. 3 is a view showing a case in which a vehicle according to an exemplary embodiment of the present disclosure outputs the plate number of the collision vehicle.

Referring to FIG. 2, the vehicle 10 according to an embodiment may have an impact due to a collision with the first vehicle 20.

In this case, the acceleration sensor 130 may output an output value corresponding to the impact detection signal based on the instantaneous impact speed. The controller 140 may determine whether the impact of the vehicle 10 has occurred by comparing the output value of the acceleration sensor 130 with a predetermined threshold value.

If it is determined that the impact of the vehicle 10 has occurred, the controller 140 may perform image processing on the first vehicle 20 that has generated the impact of the vehicle 10 based on the image data.

In detail, the controller 140 may determine the direction of the impact of the vehicle 10 based on at least one of the image data obtained by the camera 110 and the radar data obtained by the radar 120 and perform an image processing for the first vehicle 20 based on image data corresponding to the determined direction.

Also, the controller 140 may determine the vehicle closest to the vehicle 10 as the first vehicle 20 based on the image data.

That is, controller 140 may determine the first vehicle 20 in consideration of at least one of the direction of the impact and the distance between the vehicles, and perform image processing on the first vehicle 20 based on the image data including the first vehicle 20.

As illustrated in FIG. 3, the controller 140 may control the display 160 to output a message 300 including the plate number of the first vehicle 20 when the plate number of the first vehicle 20 can be identified based on the image processing for the first vehicle 20.

In this case, as image processing, a known image processing technique such as edge detection may be used. The plate number of the first vehicle 20 may be identified based on the image processing for the license plate of the first vehicle 20.

According to an exemplary embodiment, the controller 140 may control the transceiver 150 to request at least one of image data corresponding to an occurrence time of a collision of the vehicle 10, information about an occurrence time of a collision of the vehicle 10, or information about a plate number of the first vehicle 20 from another vehicles 30 when the plate number of the first vehicle 20 is not identified based on the image processing.

In this case, the another vehicle 30 may correspond to a vehicle driving at a position close to the collision point of the vehicle 10 and the first vehicle 20. The vehicle 10 may determine the vehicle, which is determined to be located within a predetermined range, as another vehicle 30 based on its location information.

In this case, the controller 140 may control the transceiver 150 to transmit the time information of the impact of the vehicle 10 to the another vehicle 30 along with the information request.

Accordingly, the controller 140 may receive information about the plate number of the first vehicle 20 through the transceiver 150. The controller 140 may receive image data corresponding to occurrence time information transmitted through the transceiver 150.

According to an exemplary embodiment, the controller 140 may obtain information about the plate number of the first vehicle 20 based on image processing for image data corresponding to the occurrence time of the collision of the vehicle 10.

According to an exemplary embodiment, the controller 140 may request the another vehicle 30 to first receive information about the plate number of the first vehicle 20 in consideration of a communication failure, a deviation from the communication range, and the like.

The controller 140 may control the display 160 to display a message 300 including the plate number of the first vehicle 20 received via the transceiver 150, as shown in FIG. 3.

In addition, the controller 140 may store image data received from another vehicle 30 in the storage 170. The controller 140 may control the display 160 or the storage 170 to output image data received from another vehicle 30 according to a user's input.

Figure 4:
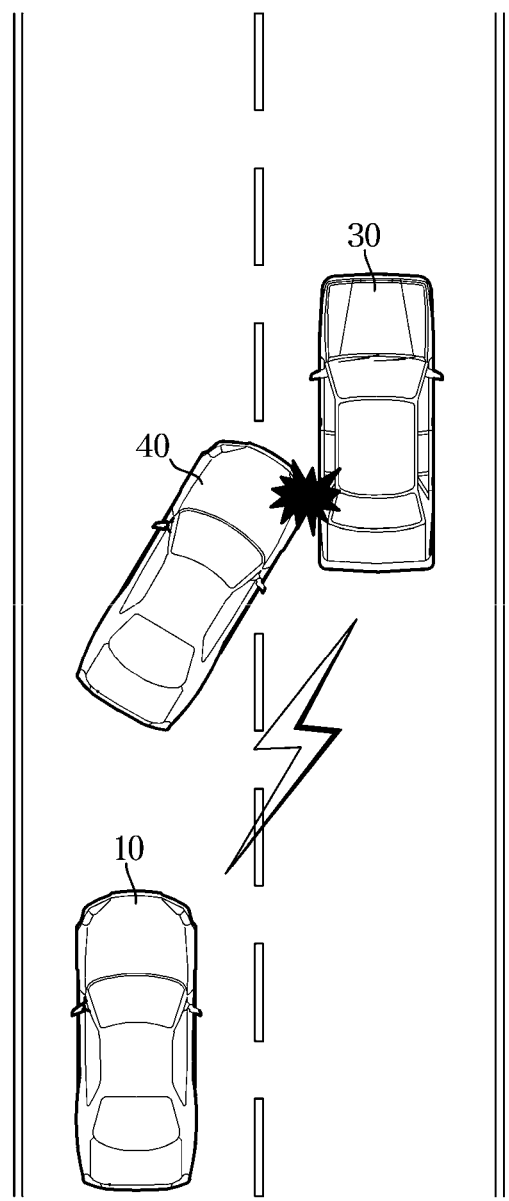
FIG. 4 is a diagram illustrating a case in which a vehicle receives a request for information on a plate number of a second vehicle from another vehicle according to an exemplary embodiment of the present disclosure.
Figure 5:
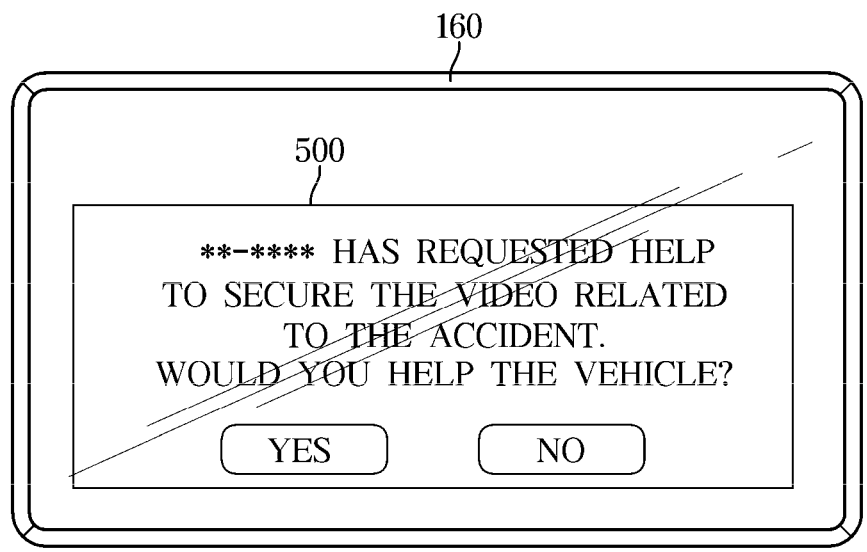
FIG. 5 is a diagram illustrating a case in which a vehicle outputs a message asking whether to approve a request according to an exemplary embodiment of the present disclosure.

FIG. 4 is a diagram illustrating a case in which a vehicle receives a request for information on a plate number of a second vehicle 40 from another vehicle according to an exemplary embodiment of the present disclosure. FIG. 5 is a diagram illustrating a case in which a vehicle outputs a message asking whether to approve a request according to an exemplary embodiment of the present disclosure.

Referring to FIG. 4, the vehicle 10 according to an exemplary embodiment may acquire image data of collision between another vehicle 30 and a second vehicle 40 through the camera 110.

In this case, the controller 140 according to an exemplary embodiment may perform image processing on the second vehicle 40 based on the image data when receiving information about the plate number of the second vehicle 40 that caused the impact of the another vehicle 30 from the another vehicle 30 through the transceiver 150.

The controller 140 may perform image processing on the second vehicle 40 based on image data corresponding to the direction of impact based on information on the direction of impact received from another vehicle 30 via transceiver 150.

In addition, the controller 140 may determine the vehicle having the closest vehicle distance to the another vehicle 30 as the second vehicle 40 based on the image data.

That is, controller 140 may determine the second vehicle 40 in consideration of at least one of the direction of the impact and the distance between the vehicles, and perform image processing on the second vehicle 40 based on the image data including the second vehicle 40.

At this time, the controller 140 may control the transceiver 150 to transmit information about the plate number of the second vehicle 40 to the another vehicle 30 when the plate number of the second vehicle 40 is identified In addition, the controller 140 may control the transceiver 150 to transmit image data corresponding to the received occurrence time information to another vehicle 30 according to an exemplary embodiment when receiving a request for image data corresponding to the occurrence time of the impact of the another vehicle 30 and the occurrence time information of the impact of the another vehicle 30 from the another vehicle 30 through the transceiver 150.

Also, according to an exemplary embodiment, the controller 140 may control the display 160 to output a message asking whether to approve the request when receiving information about the plate number of the second vehicle 40 from another vehicle through the transceiver 150 as shown in FIG. 5. In this case, the message 500 may include information about another vehicle 30.

The controller 140 may initiate image processing for the second vehicle 40 based on the input to the message 500 via an input device (not shown).

Hereinafter, a control method of the vehicle 10 according to an exemplary embodiment of the present disclosure will be described. In the control method of the vehicle 10, the vehicle 10 according to the above-described embodiment may be used. Therefore, the contents described above with reference to FIGS. 1 to 5 may be equally applied to the control method of the vehicle 10.

FIG. 6 is a flowchart illustrating a case of requesting a plate number of a first vehicle from another vehicle in a control method of a vehicle according to an exemplary embodiment of the present disclosure.

Referring to FIG. 6, the vehicle 10 according to an exemplary embodiment may determine whether an impact of the vehicle 10 occurs based on an output value of the acceleration sensor 130 (610).

If it is determined that the impact of the vehicle 10 has occurred (YES in 620), the vehicle 10 according to an exemplary embodiment may perform image processing on the first vehicle 20 that has generated the impact of the vehicle 10 (630).

When the plate number of the first vehicle 20 may be identified based on image processing (YES in 640), the vehicle 10 according to an exemplary embodiment may display the plate number of the first vehicle 20 (650).

The vehicle 10 according to an exemplary embodiment may request information about the plate number of the first vehicle 20 from another vehicle 30 (660), and may display the plate number of the first vehicle 20 received from the another vehicle 30 (670) when the plate number of the first vehicle 20 cannot be identified based on image processing (NO in 640).

According to an exemplary embodiment, the vehicle 10 may receive a request for information on an occurrence time of the impact of the vehicle 10 and corresponding image data from another vehicle 30, and may display plate number of first vehicle 20 based on processing of received image data when the plate number of the first vehicle 20 cannot be identified based on image processing, FIG. 7 is a flowchart illustrating a case where a plate number of a second vehicle 40 is requested from another vehicle in a vehicle control method according to an exemplary embodiment of the present disclosure.

Referring to FIG. 7, when a vehicle 10 according to an exemplary embodiment receives a request for information on a plate number of a second vehicle 40 (YES in 710), the vehicle 10 may output a message 500 asking whether to approve the request (720).

That is, the vehicle 10 may be requested information about the plate number of the second vehicle 40 that caused the impact of the another vehicle 30 from the another vehicle 30 through the transceiver 150, and may display the message 500 asking whether to approve the request on the display 160.

According to an exemplary embodiment, the vehicle 10 may perform image processing on the second vehicle 40 based on the image data (740) when receiving input indicating approval of the request (YES in 730).

That is, the vehicle 10 may initiate image processing for the second vehicle 40 based on the image data when receiving an input indicating approval for a message 500 from an driver via an input device (not shown).

The vehicle 10 according to an exemplary embodiment may transmit information about the plate number of the second vehicle 40 identified based on image processing to another vehicle 30 (750).

In addition, the vehicle 10 according to an exemplary embodiment may receive a request for image data corresponding to an occurrence time of the impact of the another vehicle 30 from the another vehicle 30, and may transmit image data corresponding to the occurrence time of the impact of the another vehicle 30 to the another vehicle 30 according to the reception.

According to a vehicle and a control method according to one aspect, when an accident occurs, it is possible to request and receive accident-related data from another vehicle by using the communication between the vehicles, to obtain information about the crash vehicle causing the accident more effectively.

Meanwhile, the disclosed embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. A vehicle, comprising:
a display,
an acceleration sensor configured to detect an impact of the vehicle with a first vehicle;
a camera configured to acquire first image data of an external field of view of the vehicle;
a transceiver configured to communicate with a second vehicle; and
at least one processor configured to:
determine whether an impact of the vehicle with the first vehicle has occurred based on an output value of the acceleration sensor,
perform image processing for the first vehicle that generated the impact of the vehicle based on the first image data when the at least one processor determines that the impact of the vehicle has occurred,
control the transceiver to request the second vehicle for second image data corresponding to an occurrence time of the impact of the vehicle when a plate number of the first vehicle is not identified based on the image processing, and
control the display to display the plate number of the first vehicle based on the second image data when receiving the second image data corresponding to the occurrence time of the impact of the vehicle from the second vehicle through the transceiver.

2. The vehicle according to claim 1, wherein the at least one processor is further configured to control the transceiver to request the second vehicle for information about the plate number of the first vehicle when the plate number of the first vehicle is not identified based on the image processing.

3. The vehicle according to claim 1, wherein the at least one processor is further configured to control the transceiver to transmit information about the occurrence time of the impact of the vehicle to the second vehicle when the plate number of the first vehicle is not identified based on the image processing.

4. The vehicle according to claim 1, further comprising:
a radar configured to acquire radar data of an external sensing field of view of the vehicle,
wherein the at least one processor is further configured to determine a direction of the impact of the vehicle based on at least one of the first image data obtained by the camera or the radar data obtained by the radar, and to perform the image processing for the first vehicle based on the first image data corresponding to the determined direction.

5. The vehicle according to claim 1, wherein the at least one processor is further configured to determine a nearby vehicle having a closest distance to the vehicle as the first vehicle based on the first image data.

6. The vehicle according to claim 1, wherein the at least one processor is further configured to control the display to display the plate number of the first vehicle when the plate number of the first vehicle is identified based on the image processing.

7. The vehicle according to claim 1, wherein the at least one processor is further configured to:
perform image processing for a third vehicle based on the first image data when receiving a request, from the second vehicle, for information on a plate number of the third vehicle that caused an impact of the second vehicle with the third vehicle through the transceiver, and
control the transceiver to transmit the information about the plate number of the third vehicle to the second vehicle when the plate number of the third vehicle is identified.

8. The vehicle according to claim 7, wherein the at least one processor is further configured to control the transceiver to transmit image data corresponding to an occurrence time of the impact of the second vehicle with the third vehicle to the second vehicle when receiving a request, from the second vehicle, for information on the occurrence time of the impact of the another vehicle through the transceiver.

9. The vehicle according to claim 7, further comprising:
an input device to receive an input from a driver of the vehicle,
wherein the at least one processor is further configured to:
control the display to output a message asking whether to approve the request when receiving the request through the transceiver, and
initiate the image processing for the third vehicle based on an input to the message through the input device.

10. A control method of a vehicle comprising a display, an acceleration sensor configured to detect an impact of the vehicle with a first vehicle, a transceiver configured to communicate with a second vehicle and a camera configured to acquire first image data of an external field of view of the vehicle, the control method comprising:
determining whether an impact of the vehicle with the first vehicle has occurred based on an output value of the acceleration sensor;
performing image processing for the first vehicle that generated the impact of the vehicle based on the first image data when the impact of the vehicle is determined to have occurred;
controlling the transceiver to request the second vehicle for second image data corresponding to an occurrence time of the impact of the vehicle when a plate number of the first vehicle is not identified based on the image processing; and
control the display to display the plate number of the first vehicle based on the second image data when receiving the second image data corresponding to the occurrence time of the impact of the vehicle from the second vehicle through the transceiver.

11. The control method according to claim 10, further comprising
controlling the transceiver to request the second vehicle for information about the plate number of the first vehicle when the plate number of the first vehicle is not identified based on the image processing.

12. The control method according to claim 10, further comprising
controlling the transceiver to transmit information about the occurrence time of the impact of the vehicle to the second vehicle when the plate number of the first vehicle is not identified based on the image processing.

13. The control method according to claim 10, wherein the vehicle further comprises a radar configured to acquire radar data of an external sensing field of view of the vehicle, and
wherein the performing image processing for the first vehicle comprises:
determining a direction of the impact of the vehicle based on at least one of the first image data obtained by the camera or the radar data obtained by the radar; and
performing the image processing for the first vehicle based on the first image data corresponding to the determined direction.

14. The control method according to claim 10, wherein the performing image processing for the first vehicle comprises
   determining a nearby vehicle having a closest distance to the vehicle as the first vehicle based on the first image data.

15. The control method according to claim 10, further comprising
   controlling the display to display the plate number of the first vehicle when the plate number of the first vehicle is identified based on the image processing.

16. The control method according to claim 10, further comprising:
   performing the image processing for a third vehicle based on the first image data when receiving a request, from the second vehicle, for information on a plate number of the third vehicle that caused an impact of the second vehicle with the third vehicle through the transceiver; and
   controlling the transceiver to transmit the information about the plate number of the third vehicle to the second vehicle when the plate number of the third vehicle is identified.

17. The control method according to claim 16, further comprising
   controlling the transceiver to transmit image data corresponding to an occurrence time of the impact of the second vehicle with the third vehicle to the second vehicle when receiving a request, from the second vehicle, for information on the occurrence time of the impact of the second vehicle through the transceiver.

18. The control method according to claim 16, wherein the vehicle further comprises an input device to receive an input from a driver of the vehicle, and
   wherein the performing image processing for a third vehicle comprises:
   controlling the display to output a message asking whether to approve the request when receiving the request through the transceiver; and
   initiating the image processing for the third vehicle based on an input to the message through the input device.

* * * * *